(12) United States Patent
Lorilla

(10) Patent No.: US 10,090,788 B2
(45) Date of Patent: Oct. 2, 2018

(54) OPTIMAL TORQUE RIPPLE REDUCTION THROUGH CURRENT SHAPING

(71) Applicant: Robert Bosch GmbH, Stuttgart (DE)

(72) Inventor: Leandro M. Lorilla, Northborough, MA (US)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 15/060,092

(22) Filed: Mar. 3, 2016

(65) Prior Publication Data

US 2017/0257043 A1    Sep. 7, 2017

(51) Int. Cl.
| | |
|---|---|
| H02P 6/10 | (2006.01) |
| H02P 6/17 | (2016.01) |
| H02P 21/22 | (2016.01) |
| H02P 27/08 | (2006.01) |

(52) U.S. Cl.
CPC .............. *H02P 6/10* (2013.01); *H02P 6/17* (2016.02); *H02P 21/22* (2016.02); *H02P 27/08* (2013.01)

(58) Field of Classification Search
CPC .... H02P 6/10; H02P 6/17; H02P 21/22; H02P 27/08
USPC .................................................. 318/400.23
See application file for complete search history.

(56) References Cited

U.S. PATENT DOCUMENTS

| | | | |
|---|---|---|---|
| 6,046,554 A * | 4/2000 | Becerra ............... | H02P 6/182 318/400.34 |
| 6,326,750 B1 * | 12/2001 | Marcinkiewicz ......... | H02P 6/10 318/432 |
| 6,498,451 B1 | 12/2002 | Boules et al. | |
| 8,018,193 B1 | 9/2011 | Pekarek et al. | |
| 2007/0052381 A1 | 3/2007 | Ueda et al. | |

(Continued)

FOREIGN PATENT DOCUMENTS

| | | |
|---|---|---|
| EP | 1061640 A2 | 12/2000 |
| EP | 1944861 A2 | 7/2008 |
| EP | 2779415 A2 | 9/2014 |

OTHER PUBLICATIONS

Hung J. Y. et al., "Design of Currents to Reduce Torque Ripple in Brushless Permanent Magnet Motors", IEE Proceedings B. Electrical Power Applications, vol. 140, No. 4 Part B, Jul. 1, 1993 (Jul. 1, 1993), pp. 260-266.

(Continued)

*Primary Examiner* — Eduardo Colon Santana
*Assistant Examiner* — Devon Joseph
(74) *Attorney, Agent, or Firm* — Michael Best & Friedrich LLP

(57) ABSTRACT

A motor drive system and method for controlling an electric motor. The motor drive system includes a plurality of phase lines switchably connected to the electric motor, a plurality of controllable switches, and a controller. The controller is communicatively coupled to the plurality of controllable switches and configured to receive a signal indicative of a rotor speed and a rotor position from the rotor sensor. The controller generates a value expressing a back-electromotive force (back-EMF) as a function of the rotor position with respect to a rotating frame of reference. Based on the rotor position, the controller determines a plurality of phase currents that reduce a torque ripple of the electric motor to approximately zero. The controller actuates the controllable switches to supply the electric motor with the plurality of phase currents.

18 Claims, 6 Drawing Sheets

(56) References Cited

U.S. PATENT DOCUMENTS

| | | | |
|---|---|---|---|
| 2009/0251096 A1* | 10/2009 | Schulz | H02P 6/10 |
| | | | 318/801 |
| 2013/0009579 A1 | 1/2013 | Henderson et al. | |
| 2013/0221887 A1* | 8/2013 | Aghili | H02P 6/10 |
| | | | 318/400.23 |
| 2013/0241453 A1 | 9/2013 | Rote | |
| 2015/0229247 A1* | 8/2015 | Nakai | H02P 21/06 |
| | | | 318/400.02 |

OTHER PUBLICATIONS

International Search Report for Application No. PCUEP2017/053982 dated May 29, 2017 (5 pages).

* cited by examiner

OPTIMAL TORQUE RIPPLE REDUCTION THROUGH CURRENT SHAPING

BACKGROUND

Embodiments of the invention relate to a systems and methods for reducing noise, vibration, and harshness (NVH) of an electric motor. The torque of an electric motor may experience a ripple effect (i.e., a torque ripple) due to the particular construction of the electric motor. The torque ripple may be disadvantageous in the electric motor because it may increase NVH. Torque ripple, and thus NVH, of the electric motor depends, at least in part, on the back-electromotive force (back-EMF) of the electric motor and may increase significantly given non-sinusoidal back-EMF waveforms.

SUMMARY

Embodiments reduce the NVH of the electric motor by reducing the torque ripple of an electric motor (e.g., a synchronous motor) by determining phase currents that eliminate or reduce the torque ripple. The phase currents including harmonics are determined simultaneously in a rotating frame of reference (i.e., a direct-quadrature (DQ) frame of reference synchronous with rotation) for a particular electric motor based on lumped parameters of the electric motor (e.g., back-EMF, and inductances in salient pole motors). After the phase currents are determined, a controller determines and applies corresponding voltage waveforms (dependent also on the inductances, winding resistance and speed) to inject the phase currents into the phase lines of the electric motor. This method does not require successive current injections to reduce harmonic components in the phase lines, but rather determines a set of phase currents in the rotating frame to suppress all of the harmonic components simultaneously.

When transformations to the rotating frame are made for an electric motor, it is usually assumed that values of current, voltage, flux, and the like in the rotating frame are constant. In addition, torque values in the rotating frame are typically expressed as average values. However, embodiments described herein maintain the current, voltage, flux, and torque as functions of positions of a rotor of the electric motor. As a consequence, currents and voltages will vary around average values and allow the torque ripple to be analyzed separately from the total or average value of torque.

One embodiment provides a motor drive system for controlling an electric motor. The system includes a plurality of phase lines switchably connected to the electric motor, a plurality of controllable switches each connected between the electric motor and one of the plurality of phase lines, a rotor sensor, and a controller. The controller has an electronic processor and a memory and is communicatively coupled to the plurality of controllable switches. The controller is configured to receive a signal indicative of a rotor speed and a rotor position from the rotor sensor. The controller generates a value expressing a back-electromotive force (back-EMF) as a function of the rotor position with respect to a rotating frame of reference. The controller determines a plurality of phase currents that reduce a torque ripple of the electric motor based, at least in part on, the value and the rotor position. The controller actuates the controllable switches to supply the electric motor with the plurality of phase currents.

Another embodiment provides a method of operating a motor drive system for an electric motor. The method includes receiving, at a controller, a signal indicative of a rotor speed and a rotor position. A value expressing a back-electromotive force (back-EMF) as a function of the rotor position with respect to a rotating frame of reference is generated. A plurality of phase currents are generated that reduce a torque ripple of the electric motor based, at least in part on, the value and the rotor position. A plurality of controllable switches are actuated by the controller to supply the electric motor with the plurality of phase currents.

Other aspects of various embodiments will become apparent by consideration of the detailed description and accompanying drawings.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement various embodiments. In addition, it should be understood that certain embodiments may include hardware, software, and electronic components or modules that, for purposes of discussion, may be illustrated and described as if certain components were implemented solely in hardware. However, one of ordinary skill in the art, based on a reading of this detailed description, would recognize that, in at least one embodiment, aspects may be implemented in software (e.g., stored on non-transitory computer-readable medium) executable by one or more processors. Accordingly, it should be noted that a plurality of hardware and software based devices, as well as a plurality of different structural components may be utilized to implement various embodiments. For example, "control units" and "controllers" described in the specification may include one or more electronic processors, one or more memory modules including non-transitory, computer-readable medium, one or more input/output interfaces, and various connections (e.g., a system bus, conductive tracks, wires, and the like) connecting the components.

Figure 1:
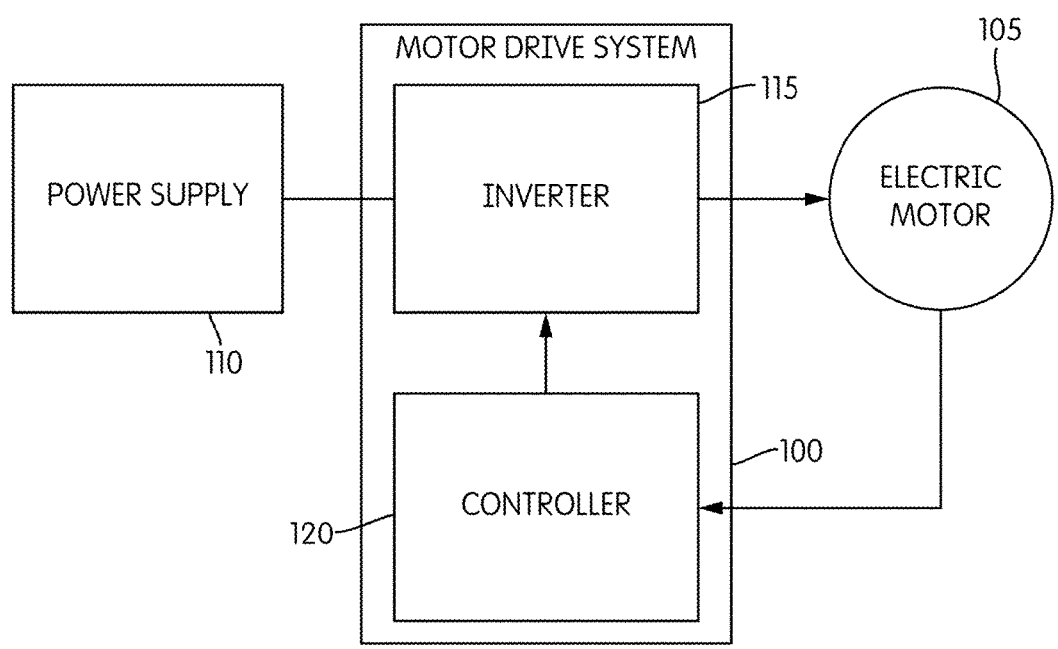
FIG. 1 is a block diagram of an electric motor and a motor drive system according to one embodiment.

FIG. 1 illustrates a motor drive system 100 electrically coupled to an electric motor 105 and a power supply 110. The motor drive system 100 includes an inverter 115 and a controller 120. The motor drive system 100 is configured to control and direct power to the electric motor 105 from the power supply 110. The power supply 110 produces direct current (DC) for supply to the electric motor 105 via the inverter 115. However, in some embodiments, an alternating current (AC) power supply may be used. In these embodiments, the AC is first rectified before being supplied to the inverter 115. The electric motor 105 may be of various types and configurations of synchronous motors. For example, the electric motor 105 may be an electrically commutated motor (ECM), a salient pole motor, a non-salient pole motor, permanent magnet, wound-field motor, and the like. In addition, the electric motor 105, the inverter 115, and controller 120 may be configured to operate using two, three, or more phases. For example, in some embodiments, the motor drive system 100 supplies the electric motor 105 with three-phase power over three phase lines.

Figure 2:
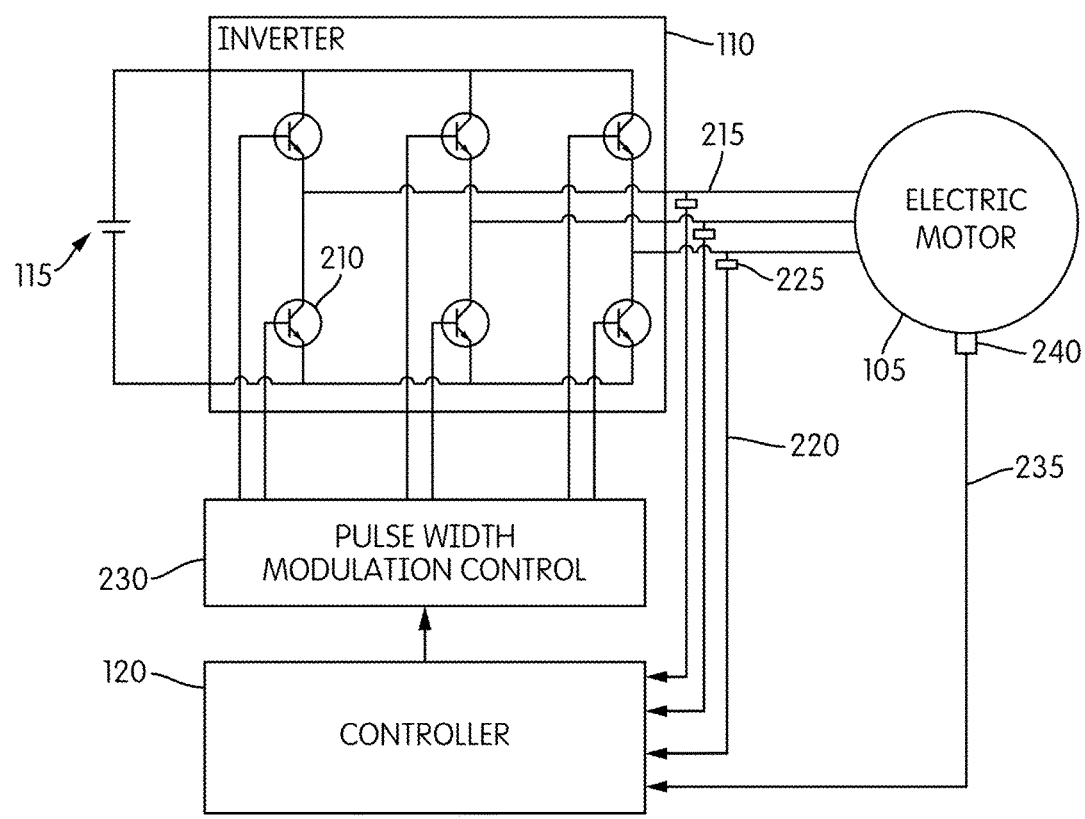
FIG. 2 is a block diagram illustrating one embodiment of the electric motor and the motor drive system of FIG. 1.

FIG. 2 illustrates components of the motor drive system 100 and associated electrical connections. In some embodiments, the inverter 115 includes a plurality of controllable switches 210. The controllable switches 210 may include various types of power transistors including metal-oxide-semiconductor field-effect transistors (MOSFETs), bipolar transistors (BJTs), and the like. The controllable switches 210 are actuated by a control signal that is representative of a voltage waveform that is generated by the controller 120. Each of the controllable switches 210 are electrically coupled to the electric motor 105 via one of a plurality of phase lines 215. The phase lines 215 are configured to transmit phase currents to the electric motor 105. One or more of the phase lines 215 are electrically coupled to the controller 120 via one or more current feedback lines 220. The current feedback lines 220 may be electrically coupled to one or more current and voltage sensors 225 positioned between the controllable switches 210 and the electric motor 105. The controller 120 receives at least one current signal via at least one of the current feedback lines 220 indicative of at least one phase current in the phase lines 215.

In some embodiments, the motor drive system 100 includes a pulse-width modulation control 230. As illustrated, the pulse-width modulation control 230 may be connected between the controller 120 and the inverter 115. In other embodiments, the pulse-width modulation control 230 may be incorporated directly within the controller 120 and be controlled, at least in part, by hardware and software of the controller 120. In other embodiments, the pulse-width modulation control 230 may be implemented as a stand-alone controller and be external to or within a housing of the controller 120. The pulse-width modulation control 230 may actuate the controllable switches 210 to generate various current and voltage waveforms in the phase lines 215. A rotor sensor 240 is connected to or is an integral part of the electric motor 105 and is communicatively coupled to the controller 120. The rotor sensor 240 may include a resolver or other circuitry (e.g., an application specific integrated circuit (ASIC)) that detects a speed and a position of a rotor of the electric motor 105. As such, the rotor sensor 240 supplies a rotor speed and a rotor position of the electric motor 105 to the controller 120 via a rotor sensor feedback line 235.

Figure 3:
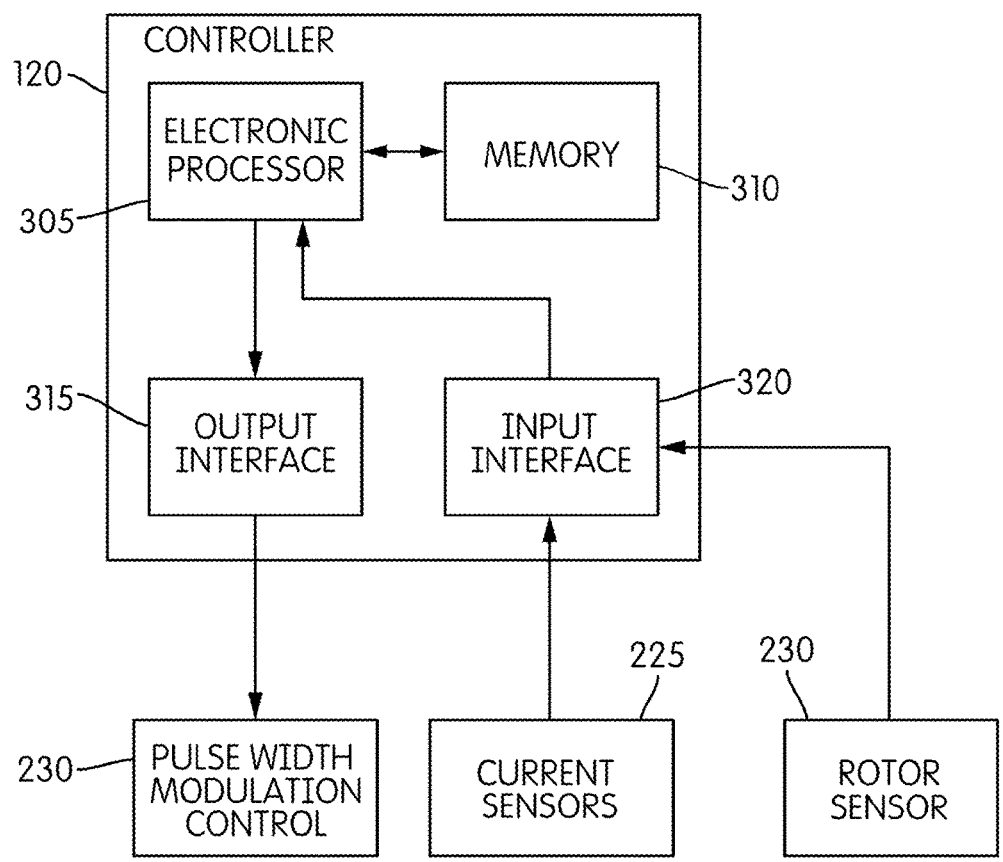
FIG. 3 is a block diagram of a controller for the motor drive system of FIGS. 1 and 2 according to one embodiment.

As illustrated in FIG. 3, the controller 120 includes a plurality of electrical and electronic components that provide power, operation control, and protection to the components and modules within the controller 120, the pulse-width modulation control 230, or both. The controller 120 includes, among other things, an electronic processor 305 (such as a programmable electronic microprocessor, microcontroller, or similar device), a memory 310 (e.g., non-transitory, machine readable memory), an output interface 315, and an input interface 320. In other embodiments, the controller 120 includes additional, fewer, or different components. The controller 120 may be implemented in several independent controllers each configured to perform specific functions or sub-functions. Additionally, the controller 120 may contain sub-modules that process inputs and outputs and perform related processes.

Components of the controller 120 and associated systems are configured to implement, among other things, processes and methods described herein. For example, the electronic processor 305 is communicatively coupled to the memory 310 and executes instructions which are capable of being stored on the memory 310. The electronic processor 305 is configured to retrieve from memory 310 and execute instructions related to the methods of operation of the controllable switches 210. In some embodiments, the output interface 315 includes serial or parallel data ports, drivers, relays, switches, and the like to communicate with the pulse-width modulation control 230.

The controller 120 is communicatively coupled to the current and voltage sensors 225 and the rotor sensor 240. As illustrated, the current and voltage sensors 225 and the rotor sensor 240 may be electrically connected to the controller 120 via the input interface 320. In this configuration, the input interface 320 may include input terminals and input hardware- or software-based logic to detect and process various input signals from the current and voltage sensors 225 and the rotor sensor 240. In particular, the controller 120 may receive one or more signals indicative of one or more phase currents including average current and ripple components (e.g., perturbation currents) from the phase lines 215.

In addition, the controller 120 may generate several types of voltage and current waveforms in the phase lines 215. The voltage and current waveforms are determined based, at least in part, on feedback from the current and voltage sensors 225 and the rotor sensor 240. To generate the voltage and current waveforms in the phase lines 215, the controller 120 first generates a plurality of lumped parameters. The lumped parameters define physical and electrical characteristics of the electric motor 105. For example, the lumped parameters may include a back-electromotive force (back-EMF), a winding resistance, a magnetic flux, and an inductance of the electric motor 105. Some of the lumped parameters are dependent on the rotor position and the rotor speed of the electric motor 105. As such, the lumped parameters may be expressed as a function of the rotor position. The lumped parameters may be expressed with respect to a stationary frame of reference (e.g., with respect to a stator of the electric motor 105) or may be expressed with respect to a rotating frame of reference (e.g., with respect to the rotor of the electric motor 105). The controller uses the position dependent lumped parameters in the rotating frame to determine the optimal current shapes that eliminate torque ripple. The lumped parameters may be predetermined for a specific motor type. In particular, the lumped parameters may be predefined during the manufacturing and testing process for each motor type. In other embodiments, some of the lumped parameters may be, at least in part, determined by the controller 120 based on the current and voltage sensors 225, the rotor sensor 240. The lumped parameters are then used by the controller 120 to calculate the phase currents to reduce the torque ripple of the electric motor 105.

Figure 4:
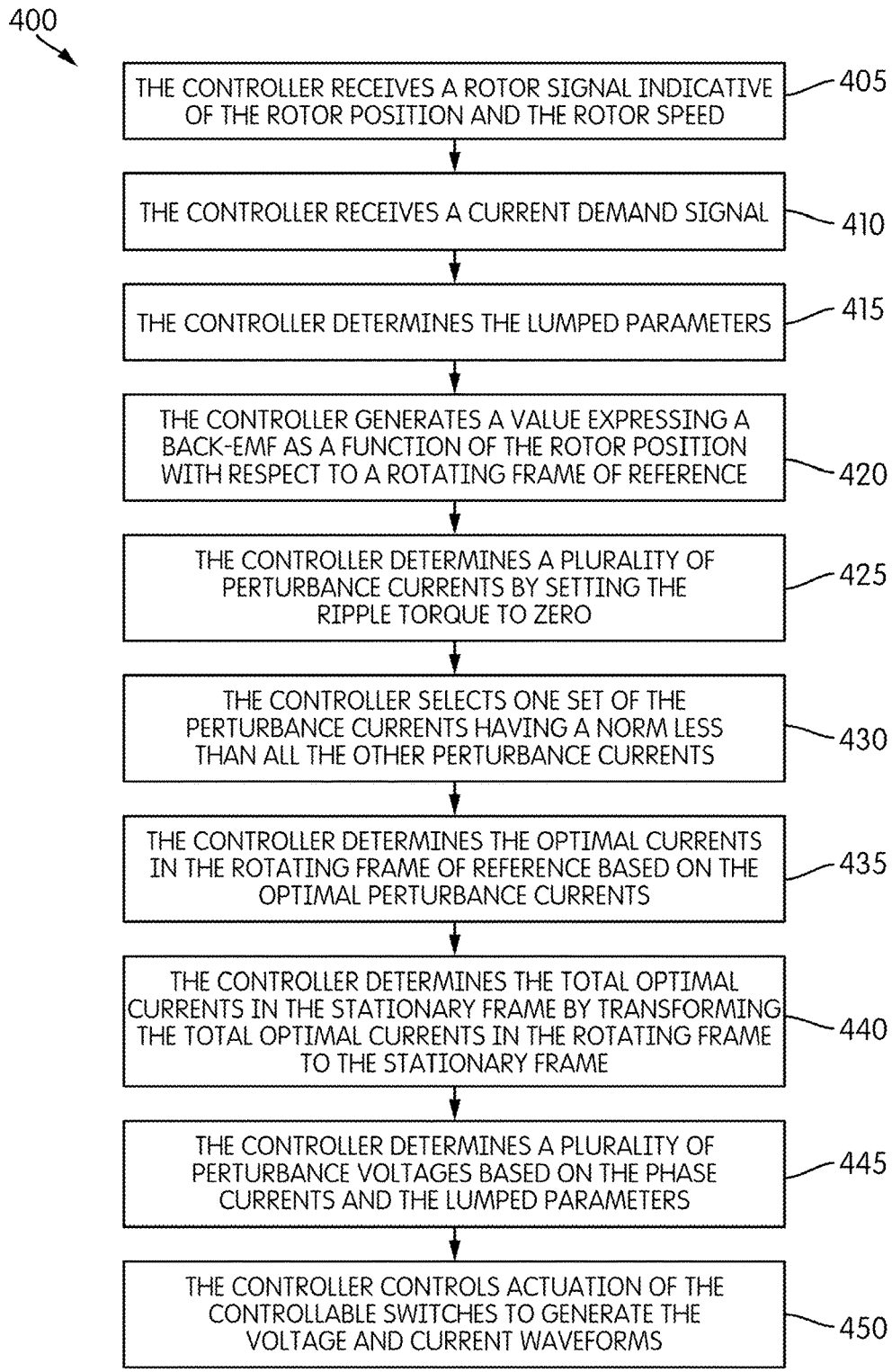
FIG. 4 is a flowchart of a method of determining a plurality of phase currents that generate approximately zero torque ripple for the electric motor of FIGS. 1 and 2.

FIG. 4 illustrates a method 400 of determining the phase currents that generate approximately zero torque ripple for the electric motor 105. The controller 120 receives a rotor signal indicative of the rotor position and the rotor speed (block 405). The controller 120 receives a current demand signal indicative of an amount of current required for a load (block 410). At block 415, the controller 120 determines the lumped parameters. The controller 120 generates a value expressing one of the lumped parameters, the back-EMF, as a function of the rotor position with respect to the rotating frame of reference (block 420). The controller 120 may generate the value of the back-EMF in several ways. In one embodiment, the controller 120 loads a predetermined value of the back-EMF with respect to the rotating frame of reference from a look-up table in the memory 310. In another embodiment, the controller 120 loads the value of the back-EMF with respect to the stationary frame of reference from the look-up table in the memory 310. In such an embodiment, the controller 120 converts the value of the back-EMF from the stationary frame of reference into the rotating frame of reference using a direct-quadrature-zero (DQ) transformation. As one example, a balanced non-salient, two-phase electric motor uses the following DQ transformation for back-EMF:

$$T_x = \begin{bmatrix} \cos(\theta_e) & \sin(\theta_e) \\ -\sin(\theta_e) & \cos(\theta_e) \end{bmatrix} \quad (1)$$

where $\theta_e$ is the electrical angle of a D-axis of the rotor with respect to one of the phase lines 215 (e.g., phase A). Once transformed, the back-EMF may be expressed as the sum of average voltages and perturbation voltages as follows:

$$v_{df} = V_{df} + \Delta v_{df}$$

$$v_{qf} = V_{qf} + \Delta v_{df} \quad (2)$$

where $v_{df}$ and $v_{qf}$ are the transformed values of the back-EMF, $V_{df}$ and $V_{qf}$ are the average voltages of the back-EMF, and $\Delta v_{df}$ and $\Delta v_{qf}$ are the position-dependent perturbation voltages of the back-EMF.

Next, in the method 400, the controller 120 determines a plurality of perturbation currents (i.e., ripple components of the phase currents expressed in the rotating frame of reference) by setting the torque ripple equal to zero (block 425). The torque ripple in the rotating frame of reference for a two-phase, non-salient motor can be determined as $$T = \frac{(v_{df} i_d + v_{qf} i_q)}{\omega_r} \quad (3)$$

where $\omega_r$ is the mechanical frequency of rotation. The phase currents expressed in the rotating frame of reference, $i_d$ and $i_q$, have the following relationship:

$$i_d = I_d + \Delta i_d$$

$$i_q = I_q + \Delta i_q \quad (4)$$

where $I_d$ and $I_q$ are the average values of the phase currents expressed in the rotating frame of reference, $\Delta i_d$ is the D-axis perturbation current, and $\Delta i_q$ is the Q-axis perturbation current. In terms of these perturbation currents, the total torque is $$T = \frac{(V_{df} + \Delta v_{df})(I_d + \Delta i_d) + (V_{qf} + \Delta v_{qf})(I_q + \Delta i_q)}{\omega_r} \quad (5)$$

and an average value of the total torque is $$\langle T \rangle = \frac{(V_{df} I_d + V_{qf} I_q)}{\omega_r} \quad (6)$$

The average values of the phase currents, $I_d$ and $I_q$, are set based on the load and determine the average torque. The torque ripple, or in other words the ripple component of the total torque, is $$T_{ac} = \frac{(V_{df} \Delta i_d + \Delta v_{df} I_d + \Delta v_{df} \Delta i_d + V_{qf} \Delta i_q + \Delta v_{qf} I_q + \Delta v_{qf} \Delta i_q)}{\omega_r} \quad (7)$$

To achieve approximately zero torque ripple, the ripple component $T_{ac}$ is set to zero ($T_{ac}=0$), and therefore, $$V_{df}\Delta i_d + \Delta v_{df} I_d + \Delta v_{df}\Delta i_d + V_{qf}\Delta i_q + \Delta v_{qf} I_q + \Delta v_{qf}\Delta i_q = 0 \quad (8)$$

And thus, $$v_{df}\Delta i_d + v_{qf}\Delta i_q + \Delta v_{df} I_d + \Delta v_{qf} I_q = 0 \quad (9)$$

Solving this equation for the Q-axis perturbation current yields:

$$\Delta i_q = -\frac{v_{df}}{v_{qf}} \Delta i_d - \frac{\Delta v_{df} I_d + \Delta v_{qf} I_q}{v_{qf}} \quad (10)$$

This equation describes an infinite set of solutions of the perturbation currents laying on a straight constraint line. Values of the set of solutions result in approximately zero torque ripple per rotor position.

At step 430 of the method 400, the controller 120 selects one set of the solutions for the perturbation currents having a smallest norm ($\Delta i_d^2 + \Delta i_q^2$). The smallest norm has a norm less than all the other solutions for the perturbation currents and describes a set of perturbation currents that are optimal. The set of perturbation currents describe phase currents with lower harmonic content than the other of the plurality of perturbation currents. As a consequence, when present in the phase lines 215, the set of perturbation currents may result in a higher efficiency and a lower voltage ripple for the electric motor 105. The set of perturbation currents may be determined by first determining an equation of a line perpendicular to the straight constraint line (i.e., a line with a slope having a negative reciprocal of a slope of the straight constraint line) that contains the origin. The line perpendicular to the straight constraint line has the shortest distance from the origin. The equation of the line perpendicular to the straight constraint line is $$\Delta i_q = \frac{v_{qf}}{v_{df}} \Delta i_d \quad (11)$$

The intersection of the two lines described by equations 10 and 11 yield the set of perturbation currents:

$$\Delta i_d = -\frac{(\Delta v_{df} I_d + \Delta v_{qf} I_q) v_{df}}{v_{df}^2 + v_{qf}^2} \quad (12)$$

$$\Delta i_q = -\frac{(\Delta v_{df} I_d + \Delta v_{qf} I_q) v_{qf}}{v_{df}^2 + v_{qf}^2} \quad (13)$$

In some embodiments, a cogging torque is also considered when determining the set of perturbation currents. In such embodiments, the equation for total torque is $$T = \frac{(v_{df} i_d + v_{qf} i_q)}{\omega_r} + T_{cog} \quad (14)$$

and zero torque ripple is obtained using the following equation:

$$v_{df} \Delta i_d + v_{qf} \Delta i_q + \Delta v_{df} I_d + \Delta v_{qf} I_q + \omega_r T_{cog} = 0 \quad (15)$$

And thus, the set of perturbation currents that achieve approximately zero torque ripple are defined as $$\Delta i_d = -\frac{(\Delta v_{df} I_d + \Delta v_{qf} I_q + \omega_r T_{cog}) v_{df}}{v_{df}^2 + v_{qf}^2} \quad (16)$$

$$\Delta i_q = -\frac{(\Delta v_{df} I_d + \Delta v_{qf} I_q + \omega_r T_{cog}) v_{qf}}{v_{df}^2 + v_{qf}^2} \quad (17)$$

The back-EMF voltages can also be expressed as normalized back-EMF shapes $k_{df}$ and $k_{qf}$, scaled by the mechanical frequency of rotation. The back-emf voltages are $$v_{df} = \omega_r k_{df}$$

$$v_{qf} = \omega_r k_{qf} \quad (18)$$

The average value of $k_{qf}$ is commonly known as the motor constant. The normalized back-EMF shapes are comprised of average and position dependent perturbation values $$k_{df} = K_{df} + \Delta k_{df}$$

$$k_{qf} = K_{qf} + \Delta k_{qf} \quad (19)$$

where $K_{df}$ and $K_{qf}$ are the average values and $\Delta k_{df}$ and $\Delta k_{qf}$ are the perturbation values.

Therefore, the optimal ripple components in the rotating frame can be shown to be independent of speed or mechanical frequency $$\Delta i_d = -\frac{(\Delta k_{df} I_d + \Delta k_{qf} I_q + T_{cog}) k_{df}}{k_{df}^2 + k_{qf}^2} \quad (20)$$

$$\Delta i_q = -\frac{(\Delta k_{df} I_d + \Delta k_{qf} I_q + T_{cog}) k_{qf}}{k_{df}^2 + k_{qf}^2} \quad (21)$$

The optimal ripple current shapes are dependent on the back-EMF shapes. They are also dependent on the commanded currents, $I_d$ and $I_q$, which may vary with speed. They can also be determined to compensate for and therefore, eliminate, the cogging torque $T_{cog}$.

At block 435, in either of the embodiments just described, after determining the set of perturbation currents, the controller 120 determines a plurality of direct-quadrature phase currents that include the average phase currents and the set of perturbation currents with respect to the rotating frame. The direct-quadrature phase currents include a direct phase current and a quadrature phase current as follows:

$$i_d^* = I_d + \Delta i_d = I_d - \frac{(\Delta k_{df} I_d + \Delta k_{qf} I_q + T_{cog}) k_{df}}{k_{df}^2 + k_{qf}^2} \quad (22)$$

$$i_q^* = I_q + \Delta i_q = I_q - \frac{(\Delta k_{df} I_d + \Delta k_{qf} I_q + T_{cog}) k_{qf}}{k_{df}^2 + k_{qf}^2} \quad (23)$$

In block 440, the controller 120 converts the direct-quadrature phase currents $i_d^*$ and $i_q^*$ that yield approximately zero torque ripple in the rotating frame to the stationary frame to obtain the phase currents $i_a$ and $i_b$ that generate approximately zero torque ripple.

In block 445, the controller 120 determines a plurality of perturbation voltages based on the phase currents and the lumped parameters. In particular, the controller 120 determines voltage waveforms that are designed to generate the phase currents in each of the phase lines 215. Once the voltage waveforms are determined, the controller 120 controls actuation of the controllable switches 210 to generate the voltage waveforms and thus, the phase currents (block 450). The voltage waveforms may be determined one harmonic at a time when mutual inductances are zero and self-inductances are constant. In general, however, the voltage waveforms may be calculated and stored in memory 310 for access by the controller 120 using the following equations.

$$\lambda_d = L_d i_d + \lambda_{df} \quad (24)$$

$$\lambda_q = L_q i_q + \lambda_{qf}$$

$$v_d = \frac{d\lambda_d}{dt} - \omega \lambda_q + i_d R \quad (25)$$

$$v_q = \frac{d\lambda_q}{dt} + \omega \lambda_d + i_q R$$

The quantities $L_d$ and $L_q$ are the position-dependent inductances, $\lambda_{df}$ are $\lambda_{qf}$ are the rotating frame transformed magnetic fluxes, and R is the winding resistance. The quantity $\omega$ is the electrical frequency in rad/s, which is equal to the mechanical frequency $\omega_r$ multiplied by the number of pole pairs. The applied voltages vary with speed. The applied voltages can also similarly be determined in the stationary frame from the lumped parameters in that frame.

In other embodiments of the method 400, the controller 120 determines the phase currents that generate approximately zero torque ripple for a three-phase, non-salient electric motor 105, when using a rotating frame power invariant transformation $$\begin{bmatrix} x_d \\ x_q \\ x_o \end{bmatrix} = \sqrt{\frac{2}{3}} \begin{bmatrix} \cos(\theta_e) & \cos(\theta_e - 2\pi/3) & \cos(\theta_e + 2\pi/3) \\ -\sin(\theta_e) & -\sin(\theta_e - 2\pi/3) & -\sin(\theta_e + 2\pi/3) \\ 1/\sqrt{2} & 1/\sqrt{2} & 1/\sqrt{2} \end{bmatrix} \begin{bmatrix} x_a \\ x_b \\ x_c \end{bmatrix} \quad (26)$$

In these embodiments, the equations include determining three perturbation currents based on the following equations:

$$\Delta i_d = -\frac{(\Delta k_{df} I_d + \Delta k_{qf} I_q + \Delta k_{of} I_o + T_{cog})k_{df}}{k_{df}^2 + k_{qf}^2 + k_{of}^2} \quad (27)$$

$$\Delta i_q = -\frac{(\Delta k_{df} I_d + \Delta k_{qf} I_q + \Delta k_{of} I_o + T_{cog})k_{qf}}{k_{df}^2 + k_{qf}^2 + k_{of}^2} \quad (28)$$

$$\Delta i_o = -\frac{(\Delta k_{df} I_d + \Delta k_{qf} I_q + \Delta k_{of} I_o + T_{cog})k_{of}}{k_{df}^2 + k_{qf}^2 + k_{of}^2} \quad (29)$$

where the zero subscripts in $I_o$, and $k_{of}$ correspond to zero-sequence components.

The zero sequence currents shown above can be injected in a 3H bridge configuration. For wye (star) or delta connected three-phase windings, new zero sequence current perturbations $\Delta i_0$ may not be injected. The currents introduced may only include the D and Q axes ripple currents. Wye (star) zero sequence currents may be zero in a balanced case and delta zero sequence currents are circulating currents that depend on the lumped parameters of the motor.

Another three-phase stator to DQ frame transformation that is commonly used is $$\begin{bmatrix} x_d \\ x_q \\ x_o \end{bmatrix} = \frac{2}{3} \begin{bmatrix} \cos(\theta_e) & \cos(\theta_e - 2\pi/3) & \cos(\theta_e + 2\pi/3) \\ -\sin(\theta_e) & -\sin(\theta_e - 2\pi/3) & -\sin(\theta_e + 2\pi/3) \\ 1/\sqrt{2} & 1/\sqrt{2} & 1/\sqrt{2} \end{bmatrix} \begin{bmatrix} x_a \\ x_b \\ x_c \end{bmatrix} \quad (30)$$

When using the rotating frame power-variant transformation in equation 30, the optimal current ripples become $$\Delta i_d^* = \frac{(3/2\Delta k_{df} I_d + 3/2\Delta k_{qf} I_q + 3\Delta k_{of} I_o + T_{cog})(3/2k_{df})}{9/4(k_{df}^2 + k_{qf}^2) + 9k_{of}^2} \quad (31)$$

$$\Delta i_q^* = \frac{(3/2\Delta k_{df} I_d + 3/2\Delta k_{qf} I_q + 3\Delta k_{of} I_o + T_{cog})(3/2k_{qf})}{9/4(k_{df}^2 + k_{qf}^2) + k_{of}^2} \quad (32)$$

$$\Delta i_o^* = \frac{(3/2\Delta k_{df} I_d + 3/2\Delta k_{qf} I_q + 3\Delta k_{of} I_o + T_{cog})(3k_{of})}{9/4(k_{df}^2 + k_{qf}^2) + 9k_{of}^2} \quad (33)$$

In yet other embodiments of the method 400, the controller 120 determines the phase currents that generate approximately zero torque ripple for a three-phase, salient pole electric motor 105 when using a power-invariant DQ transformation. For a salient pole motor, the phase currents will also depend on inductances that are dependent on rotor position. In order to generate the phase currents, the corresponding voltages are calculated based on rotor speed, the back-EMF voltages, the inductances, and the resistances.

In these embodiments, the total torque of the electric motor 105 depends, at least in part, on the inductance of the electric motor 105. The equation for total torque of the three-phase, non-salient electric motor 105 when using a power-invariant transformation is as follows:

$$T = \frac{(v_{df} i_d + v_{qf} i_q + v_{of} i_o)}{\omega_r} + p(L_d - L_q)i_d i_q + \frac{1}{2} p\left(\frac{\partial L_d}{\partial \theta_e} i_d^2 + \frac{\partial L_q}{\partial \theta_e} i_q^2 + \frac{\partial L_o}{\partial \theta_e} i_0^2\right) + T_{cog} \quad (34)$$

As in the other embodiments, the average value can be subtracted out, leaving the ripple component of the torque that is set to zero and the phase currents are determined by using an optimization that meets the constraint and minimizes the norm of the perturbation currents. Then, the voltage waveforms are determined based on the perturbation currents. Using the power-variant transformation, the torque equation becomes $$T = \frac{\left(\frac{3}{2}v_{df} i_d + \frac{3}{2}v_{qf} i_q + 3v_{of} i_o\right)}{\omega_r} + \frac{3}{2} p(L_d - L_q)i_d i_q + \frac{1}{2} p\left(\frac{3}{2}\frac{dL_d}{d\theta_e} i_d^2 + \frac{3}{2}\frac{dL_q}{d\theta_e} i_q^2 + 3\frac{dL_o}{d\theta_e} i_0^2\right) + T_{cog} \quad (35)$$

In some embodiments, once the voltage waveforms are determined, the pulse-width modulation control 230 generates a plurality of pulse-width modulated waveforms that approximate the voltage waveforms. The pulse-width modulated waveforms are applied to the controllable switches 210 to inject the voltage waveforms into the electric motor 105.

The steps of the method 400 may be performed in various orders. For example, the controller 120 may determine the perturbation currents and then convert the perturbation currents to the stationary frame based on feedback from the rotor position without first determining perturbation voltages in the rotating frame of reference. In this case, the pulse-width modulation control 230 may receive a signal from the controller 120 indicative of the determined phase currents and feedback of the measured phase currents with reference to the stationary frame of reference from the phase lines 215. Using these values, the pulse-width modulation control 230 may implement the determined phase currents using the controllable switches 210.

In other embodiments, the controller 120 may use a feedback signal from the electric motor 105 indicative of the measured phase currents in the rotating frame of reference. In these embodiments, the controller 120 may use the measured phase currents and the determined phase currents to calculate the voltage waveforms that generate the determined phase currents.

In yet other embodiments, the controller 120 may include a low-pass filter and a high-pass filter. In these embodiments, the feedback signal indicative of the measured phase currents in the stationary frame of reference is converted to the rotating frame of reference based on the rotor position. Once converted, the feedback signal is passed through a high-pass filter and a low-pass filter. The low-pass filter outputs a feedback signal indicative of an average value of the measured phase currents and the high-pass filter outputs a feedback signal indicative of perturbation current of the measured phase currents. The perturbation values may then be added to the average voltage and transformed into the stationary frame of reference based on the rotor position to obtain the voltage waveforms in the stationary frame for the pulse-width modulation control 230.

Figure 5:
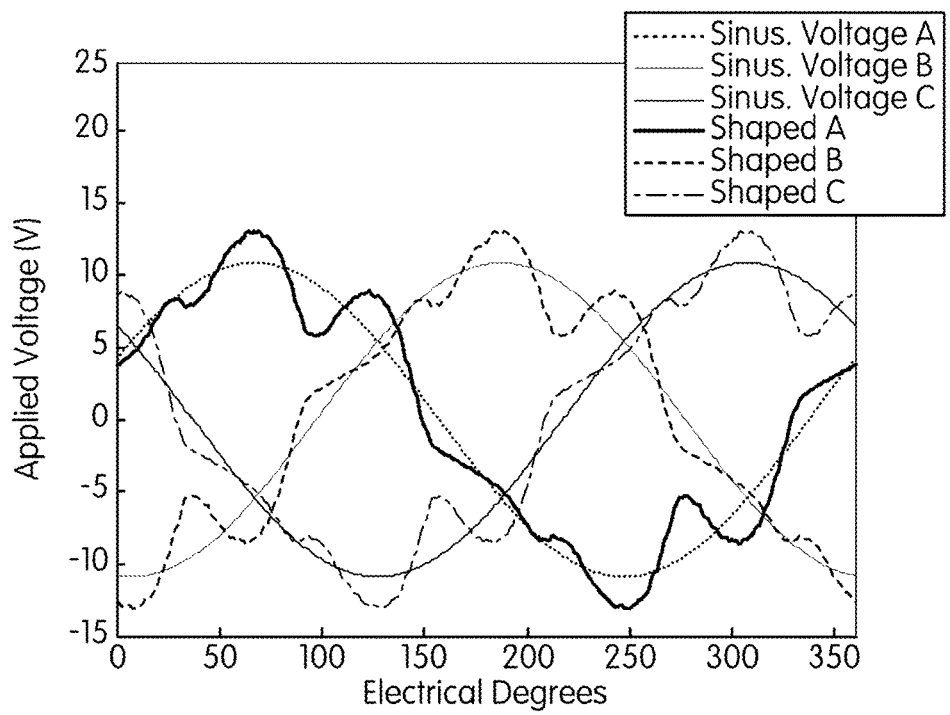
FIG. 5 is a graph of example values of the plurality of phase currents as compared to sinusoidal current waveforms of the method of FIG. 4.
Figure 6:
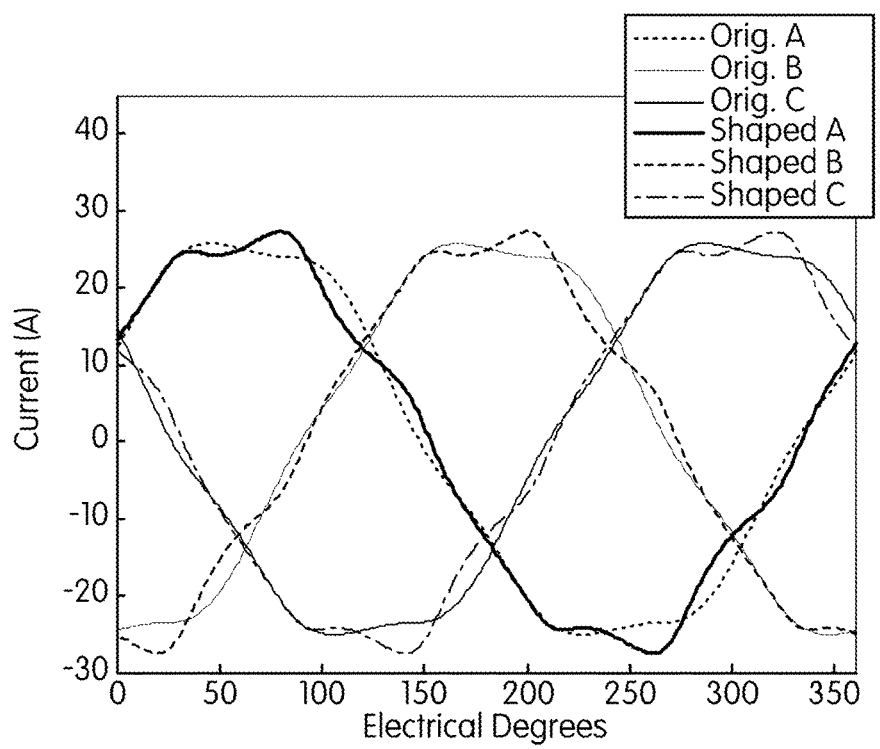
FIG. 6 is a graph of example values of a plurality of voltage waveforms that generate the phase currents of FIG. 5.
Figure 7:
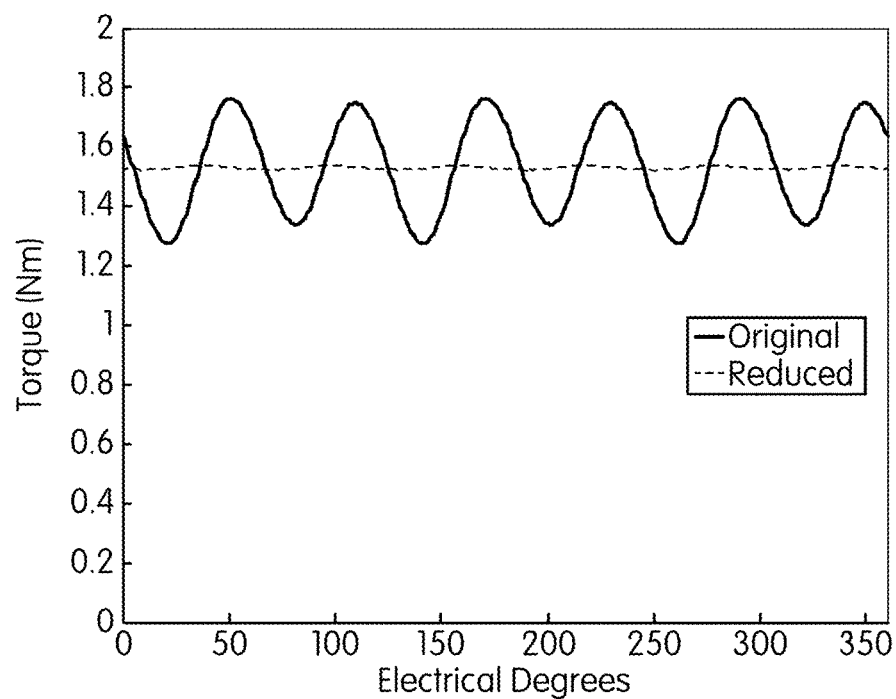
FIG. 7 is a graph of example values of torque ripple of the electric motor of FIGS. 1 and 2.
Figure 8:
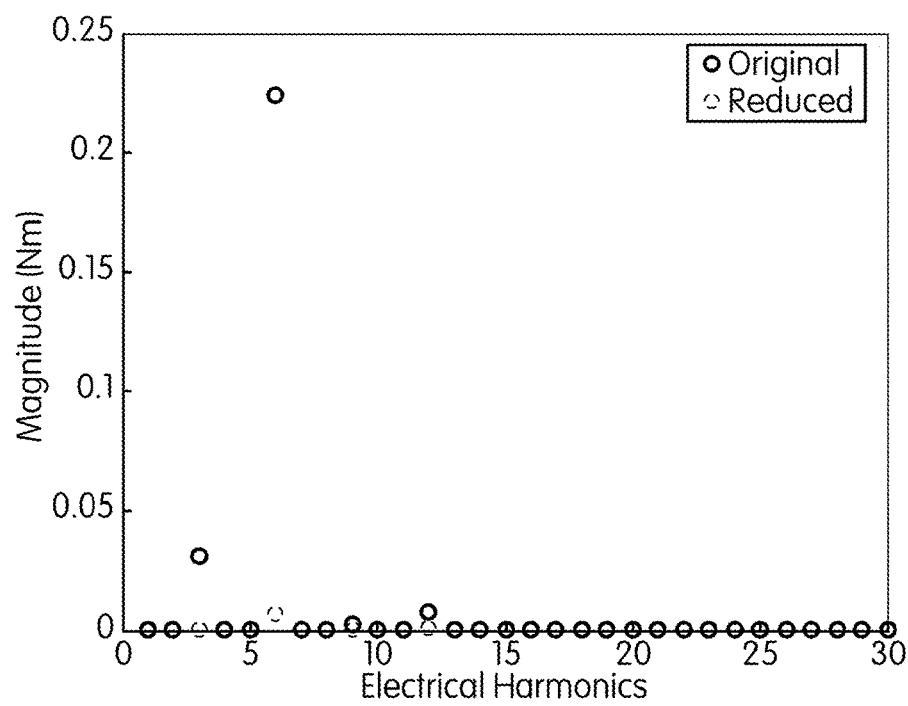
FIG. 8 is a graph of example values of harmonic components of the electric motor of FIGS. 1 and 2.

FIGS. 5 through 8 illustrate comparisons between the behavior of signals of the electric motor 105 prior to performance of the method 400 and after performance of the method 400. In particular, FIG. 5 is a graph comparing phase currents for standard three-phase current waveforms and phase currents as determined by the method 400. FIG. 6 illustrates standard three-phase voltage waveforms as compared to voltage waveforms that are determined by the method 400. FIG. 7 illustrates the torque ripple prior to the method 400 (e.g., the approximately sinusoidal torque ripple) and the torque ripple after performing the method 400 (e.g., an approximately flat torque ripple). FIG. 8 illustrates harmonic components within the electric motor 105. The harmonic components exhibit a much higher magnitude before performance of the method 400 than after performance of the method 400.

Thus, the invention provides, among other things, a system and a method for controlling an electric motor that reduces torque ripple of the electric motor by injecting specific voltage waveforms as determined by a controller. Various features and advantages of the invention are set forth in the following claims.

What is claimed is:

1. A motor drive system for controlling an electric motor comprising:
   a plurality of phase lines switchably connected to the electric motor;
   a plurality of controllable switches each connected between the electric motor and one of the plurality of phase lines;
   a rotor sensor;
   a controller having an electronic processor and a memory, the controller communicatively coupled to the plurality of controllable switches and configured to
      receive a signal indicative of a rotor position from the rotor sensor,
      calculate a value expressing a back-electromotive force (back-EMF) as a function of the rotor position with respect to a frame of reference aligned with the rotor position,
      determine a plurality of perturbation currents with respect to the frame of reference aligned with the rotor position that set a torque ripple of the electric motor to approximately zero,
      select one set from the plurality of perturbation currents, the one set having a smallest norm,
      determine a plurality of phase currents that reduce the torque ripple of the electric motor based on both the value and the rotor position, and
      actuate the controllable switches to supply the electric motor with the plurality of phase currents.

2. The motor drive system of claim 1, wherein the controller is configured to calculate a plurality of values expressing characteristics of the electric motor with respect to the frame of reference aligned with the rotor position prior to determining the plurality of phase currents, and wherein the controller is configured to determine the plurality of phase currents in frame of reference aligned with the rotor position with respect to the electric motor.

3. The motor drive system of claim 1, wherein the controller is configured to calculate the value expressing the back-electromotive force (back-EMF) as a function of the rotor position with respect to the frame of reference aligned with the rotor position by converting a predetermined value of the back-EMF as a function of rotor position with respect to a stationary frame of reference.

4. The motor drive system of claim 1, wherein the controller is configured to
   receive a control signal indicative of a desired power output of the electric motor, and
   determine the plurality of phase currents, at least in part, on the control signal.

5. The motor drive system of claim 1, wherein the controller is configured to
   determine the plurality of phase currents by first determining the plurality of perturbation currents with respect to the frame of reference aligned with the rotor position that set a torque ripple of the electric motor to approximately zero.

6. The motor drive system of claim 5, wherein the controller is configured to
   determine the plurality of perturbation currents based on the back-EMF, the rotor position, and a control signal indicative of a desired power output of the electric motor.

7. The motor drive system of claim 6, wherein the controller is configured to
   determine a set of direct-quadrature phase currents based on the one set of the plurality of perturbation currents, and
   transform the set of direct-quadrature phase currents to a stationary frame to obtain the plurality of phase currents.

8. The motor drive system of claim 1, further comprising:
   a current sensor positioned between at least one of the plurality of controllable switches and the electric motor, the current sensor configured to generate a current signal indicative of a current supplied to the electric motor via the at least one of the plurality of controllable switches, wherein
   the controller is configured to determine a plurality of voltage waveforms to supply to the electric motor based, at least in part, on the current signal, each of the plurality of voltage waveforms designed to generate one of the plurality of phase currents.

9. The motor drive system of claim 8, wherein the controller is configured to determine the plurality of voltage waveforms to supply to the electric motor based, at least in part, on an inductance of the electric motor as a function of rotor position.

10. A method of operating a motor drive system for an electric motor, the method comprising:
    receiving, at a controller, a signal indicative of a rotor position;
    calculating a value expressing a back-electromotive force (back-EMF) as a function of the rotor position with respect to a frame of reference aligned with the rotor position,
    determining a plurality of perturbation currents with respect to the frame of reference aligned with the rotor position that set a torque ripple of the electric motor to approximately zero,
    selecting one set from the plurality of perturbation currents, the one set having a smallest norm,
    determining a plurality of phase currents that reduce the torque ripple of the electric motor based on both the value and the rotor position, and
    actuating a plurality of controllable switches to supply the electric motor with the plurality of phase currents.

11. The method of operating the motor drive system of claim 10, the method further comprising:
    calculating a plurality of values expressing characteristics of the electric motor with respect to the frame of reference aligned with the rotor position prior to determining the plurality of phase currents, and
    determining the plurality of phase currents in a stationary frame of reference with respect to the electric motor.

12. The method of operating the motor drive system of claim 11, the method further comprising:
    determining the plurality of phase currents by first determining the plurality of perturbation currents with respect to the frame of reference aligned with the rotor position that set a torque ripple of the electric motor to approximately zero.

13. The method of operating the motor drive system of claim 12, the method further comprising:
    determining the plurality of phase currents based on the back-EMF, the rotor position, and a control signal indicative of a desired power output of the electric motor.

14. The method of operating the motor drive system of claim 13, the method further comprising:
    determining a set of direct-quadrature phase currents based on the one set of the plurality of perturbation currents, and
    transforming the set of direct-quadrature phase currents to the stationary frame to obtain the plurality of phase currents.

15. The method of operating the motor drive system of claim 10, the method further comprising:
    calculating the value expressing the back-electromotive force (back-EMF) as a function of the rotor position with respect to the frame of reference aligned with the rotor position by converting a predetermined value of the back-EMF as a function of rotor position with respect to a stationary frame of reference.

16. The method of operating the motor drive system of claim 10, the method further comprising:
    receiving a control signal indicative of a desired power output of the electric motor, and
    determining the plurality of phase currents, at least in part, on the control signal.

17. The method of operating the motor drive system of claim 10, the method further comprising:
    receiving a current signal indicative of a current supplied to the electric motor; and
    determining a plurality of voltage waveforms to supply to the electric motor based, at least in part, on the current signal, each of the plurality of voltage waveforms designed to generate one of the plurality of phase currents.

18. The method of operating the motor drive system of claim 17, the method further comprising:
    determining the plurality of voltage waveforms to supply to the electric motor based, at least in part, on an inductance of the electric motor as a function of rotor position.

* * * * *